(12) United States Patent
Okubora

(10) Patent No.: US 7,142,739 B2
(45) Date of Patent: Nov. 28, 2006

(54) PHOTOELECTRONIC DEVICE AND PRODUCTION METHOD OF THE SAME

(75) Inventor: Akihiko Okubora, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/170,431

(22) Filed: Jun. 29, 2005

(65) Prior Publication Data

US 2006/0023991 A1    Feb. 2, 2006

(30) Foreign Application Priority Data

Jul. 29, 2004    (JP)    ............................. 2004-221984

(51) Int. Cl.
*G02B 6/12*    (2006.01)
*G02B 6/125*    (2006.01)

(52) U.S. Cl. ............................. 385/14; 385/31; 385/32; 385/44

(58) Field of Classification Search .................. 385/14, 385/24, 27, 31, 32, 36, 39, 44, 49, 50, 88–89, 385/129–131
See application file for complete search history.

(56) References Cited

U.S. PATENT DOCUMENTS 6,804,423 B1 * 10/2004 Tsukamoto et al. ............ 385/14
6,968,109 B1 * 11/2005 Furuyama .................... 385/129
2002/0039464 A1 * 4/2002 Yoshimura et al. ............ 385/14
2005/0074207 A1 * 4/2005 Shioda et al. .................. 385/31

* cited by examiner

*Primary Examiner*—Hemang Sanghavi
(74) *Attorney, Agent, or Firm*—Robert J. Depke; Rockey, Depke, Lyons & Kitzinger LLC

(57) ABSTRACT

A photoelectronic device capable of maintaining the degree of freedom in designing for dealing with design changes and responding to producing a variety of kinds in a small amount, and the production method are provided: wherein a light emitting element for emitting a light to be a clock signal, a semiconductor chip provided with light receiving portions for receiving the light, and an optical waveguide sheet formed to be a sheet, wherein an outer circumference of a core is covered with a clad, adhered to said semiconductor chip are provided; and the optical waveguide sheet is configured to be irradiated at a light incident portion of a core with a light from the light emitting element and includes one or more T-shaped branch having a vertical opening portion having a vertical inner wall, which is vertical with respect to the direction within a surface of the optical waveguide sheet and becomes a mirror surface for dividing and reflecting the light, and a sloping opening portion having a sloping inner wall, which has an inclination with the optical waveguide direction of the core and becomes a mirror surface for reflecting the light to the direction being out of the surface of the optical waveguide sheet so as to be connected to a light receiving portion at a connection position of each of the lights and each of the light receiving portions.

16 Claims, 8 Drawing Sheets

10··· SEMICONDUCTOR CHIP
20··· LIGHT EMITTING ELEMENT
30··· OPTICAL WAVEGUIDE SHEET
S ··· T-SHAPE BRANCH
Pi ··· SLOPING OPENING PORTION
Pv··· VERTICAL OPENING PORTION

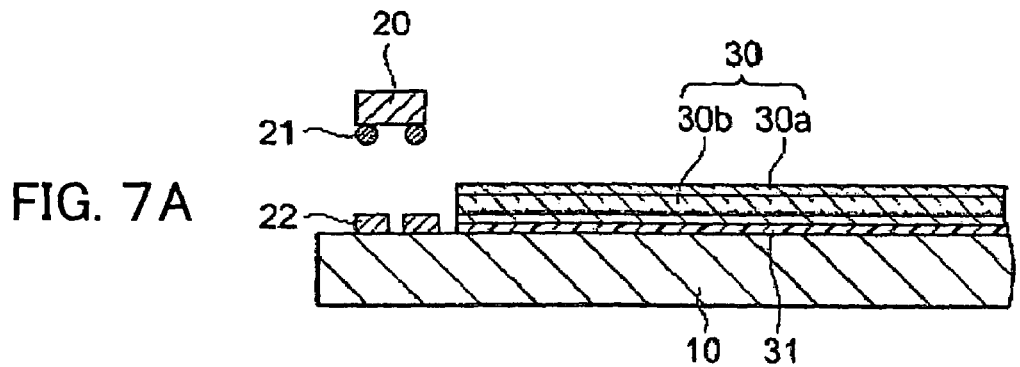
FIG. 7A
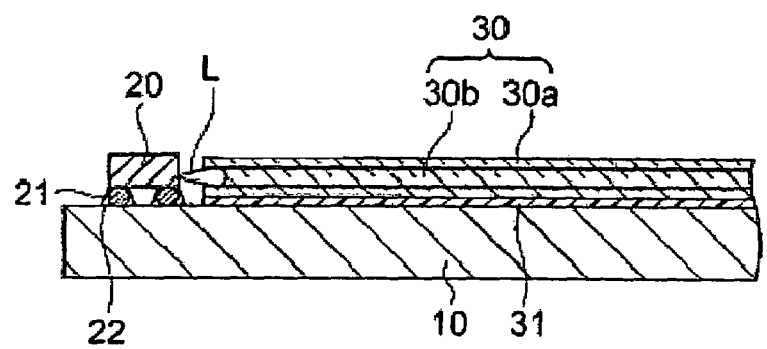
FIG. 7B
FIG. 8
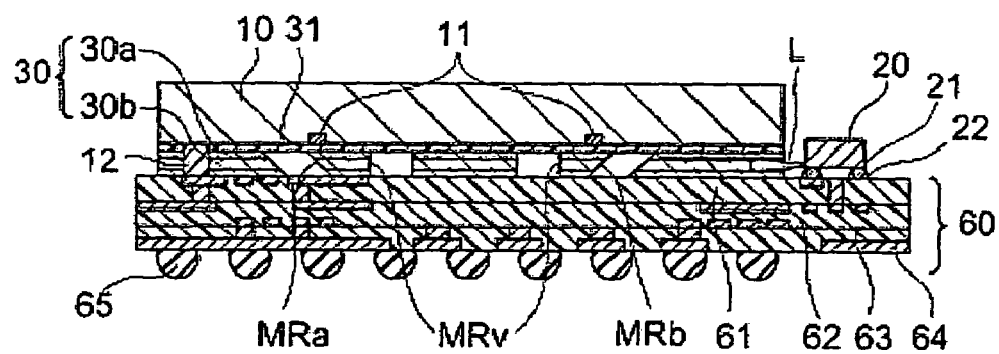

PHOTOELECTRONIC DEVICE AND PRODUCTION METHOD OF THE SAME

CROSS REFERENCES TO RELATED APPLICATIONS

The present invention contains subject matter related to Japanese Patent Application JP 2004-221984 filed in the Japanese Patent Office on Jul. 29, 2004, the entire contents of which being incorporated herein by reference.

BACKGROUND OF THE INVENTION

1. Field of the Invention

The present invention relates to a photoelectronic device and the production method and, particularly, relates to a photoelectronic device configured that a light emitting element for emitting a light to be a clock signal is optically connected to a semiconductor chip having an electron circuit including a light receiving portion by an optical waveguide sheet, and the production method.

2. Description of the Related Art

Demands for portable electronic apparatuses, such as a digital video camera, a digital cellular phone and a notebook personal computer, to be more compact, thinner and lighter have only become stronger and, to respond thereto, a reduction in size by 70% has attained in a VLSI and other semiconductor devices in three years.

On the other hand, a package form of semiconductor devices has also developed from a lead-inserted type, such as a DIP (Dual Inline Package), to a surface mounting type and a flip-chip mounting type, furthermore, to a complex form called a system-in-package (SIP), wherein a semiconductor chip provided with an active element is packaged with a passive element.

As explained above, development of semiconductor techniques is remarkable, and particularly in the field of a CPU and high-speed logic LSI, the clock frequency has already exceeded GHz order.

Wiring of a signal exceeding GHz suffers from a lot of disadvantages to be solved inside and outside the LSI, which have not been any problems before, and solution of these disadvantages is a very significant element in recent semiconductors becoming furthermore higher in integration and higher in speed.

The disadvantages are signal distortion (signal integrity), a frequency limit of electric wiring, a loss of wiring, delay of wiring, radiation from wiring, a signal skew, and an increase of power consumption relating to driving wiring, etc.

Particularly, in recent years, a skew (timing difference) of a clock to be supplied in an LSI chip or to different LSIs has become a problem. For example, time of 1 digit of 1 GHz is 500 ps, and time of rising and falling is about several 10 ps to 200 ps or shorter, while in wiring on a general dielectric, wherein $\in=4$ or so, a rough propagation speed of an electric signal is 67 ps/cm, which has reached an unignorable range with respect to the rising time.

Thus, lots of attempts have been made to suppress a wiring skew by using completely equal-length wiring also for wiring on a mounting substrate or on an LSI, and dividing a clock to wiring having an H-shape called an H bar to suppress a wiring skew.

When performing clock dividing by electric wiring of the related art, there was a disadvantage that a power consumption became large because a wiring load was always driven by a clock frequency, furthermore, waveform shaping was performed at each dividing point.

To overcome the above disadvantages, instead of electric wiring using a metal, such as aluminum and copper, there is a proposal of using optics for wiring and dividing a clock.

For example, the non-patent article (Shiou Lin Sam, Anantha Chandrakasan and Duane Boning, Variation Issues in On-Chip Optical Clock Distribution, Sixth International Workshop on Statistical Methodologies for IC Processes, Devices, and Circuits, Kyoto, Japan, June 2001) discloses a technique of obtaining a wiring plate having an optical clock tree by forming an optical waveguide on a silicon substrate and processing the same by using a mask in a semiconductor process for each LSI.

However, in the above method of forming clock wiring layers successively by a semiconductor process on a substrate, such as silicon, ceramic or an organic substrate, there is a trouble that design and a mask corresponding to a specific LSI have to be made and processing has to be performed for that each time.

Also, since all production processes are performed sequentially, the entire TAT (turn around time) becomes long and it is hard to deal with small changes.

SUMMARY OF THE INVENTION

It is desired to solve disadvantages that it is hard to maintain the degree of freedom in designing for dealing with design changes and that it is difficult to respond to producing a variety of kinds in a small amount.

According to the present invention, there is provided a photoelectronic device, comprising a light emitting element for emitting a light to be a clock signal; a semiconductor chip provided with light receiving portions for receiving the light; and an optical waveguide sheet formed to be a sheet, wherein an outer circumference of a core is covered with a clad, and adhered to the semiconductor chip; wherein the optical waveguide sheet is irradiated at a light incident portion of the core with the light from the light emitting element; the optical waveguide sheet is provided with one or more T-shaped branch, and at each T-shaped branch is provided with a vertical opening portion having a vertical inner wall being vertical with respect to the direction within a surface of the optical waveguide sheet, and the vertical inner wall serves as a mirror surface for dividing, reflecting and guiding the light to two different directions; and a sloping opening portion having a sloping inner wall having an inclination with the optical waveguide direction of the core is provided at a position of connecting each of the divided lights to each of the light receiving portions, and the sloping inner wall serves as a mirror surface for reflecting the light to the direction being out of the surface of the optical waveguide sheet to be connected to the light receiving portion.

The above photoelectronic device has a light emitting element for emitting a light to be a clock signal, a semiconductor chip provided with light receiving portions for receiving the light, and an optical waveguide sheet formed to be a sheet, wherein an outer circumference of a core is covered with a clad, and adhered to the semiconductor chip.

Here, the optical waveguide sheet has the configuration that the light from the light emitting element is irradiated at a light incident portion of the core with, it is provided with one or more T-shaped branch, at each T-shaped branch is provided with a vertical opening portion having a vertical inner wall being vertical with respect to the direction within a surface of the optical waveguide sheet, and the vertical inner wall serves as a mirror surface for dividing, reflecting and guiding the light to two different directions, furthermore, a sloping opening portion having a sloping inner wall having an inclination with the optical waveguide direction of the core is provided at a position of connecting each of the divided lights to each of the light receiving portions, and the sloping inner wall serves as a mirror surface for reflecting the light to the direction being out of the surface of the optical waveguide sheet to be connected to the light receiving portion.

According to the present invention, there is provided a production method of a photoelectronic device for producing a photoelectronic device including a light emitting element for emitting a light to be a clock signal, a semiconductor chip provided with light receiving portions for receiving the light, and an optical waveguide sheet for dividing the light to two or more and guiding the same to be connected to the light receiving portions at positions of connecting to the light receiving portions, comprising the steps of: forming a first clad on a dummy substrate, forming a core on the first clad to be a pattern having one or more T-shaped branch and forming a second clad to cover the core, thereby forming an optical waveguide sheet formed to be a sheet wherein an outer circumference of the core is covered with the clad; forming at a position of the T-shaped branch on the optical waveguide sheet a vertical opening portion having a vertical inner wall, which is vertical with respect to the direction within the surface of the optical waveguide sheet and becomes a mirror surface for dividing and reflecting the light to two different directions; forming at a position of connecting the light to the light receiving portion on the optical waveguide sheet a sloping opening portion having a sloping inner wall, which has an inclination with the optical waveguide direction of the core and becomes a mirror surface for reflecting the light to the direction being out of the surface of the optical waveguide sheet so as to be connected to the light receiving portion; releasing the optical waveguide sheet from the dummy substrate; aligning the optical waveguide sheet with the light receiving portion and adhering to the semiconductor chip; and mounting the light emitting element by arranging the same, so that a light from the light emitting element irradiates a light incident portion of the core.

The above production method of a photoelectronic device is for producing a photoelectronic device having a light emitting element for emitting a light to be a clock signal, a semiconductor chip provided with light receiving portions for receiving the light, and an optical waveguide sheet for dividing the light to two or more and guiding the same to be connected to the light receiving portions at positions of connecting to the light receiving portions.

First, a first clad is formed on a dummy substrate, a core is formed on the first clad to be a pattern having one or more T-shaped branch, and a second clad is formed to cover the core, thereby an optical waveguide sheet formed to be a sheet, wherein an outer circumference of the core is covered with the clad, is formed.

Next, a vertical opening portion having a vertical inner wall, which is vertical with respect to the direction within the surface of the optical waveguide sheet and becomes a mirror surface for dividing and reflecting the light to two different directions, is formed at a position of the T-shaped branch on the optical waveguide sheet.

Next, a sloping opening portion having a sloping inner wall, which has an inclination with the optical waveguide direction of the core and becomes a mirror surface for reflecting the light to the direction being out of the surface of the optical waveguide sheet so as to be connected to the light receiving portion, is formed at a position of connecting the light to the light receiving portion on the optical waveguide sheet.

Next, the optical waveguide sheet is released from the dummy substrate, and the optical waveguide sheet is aligned with the light receiving portion and adhering to the semiconductor chip.

Next, the light emitting element is arranged at a predetermined position for mounting, so that a light from the light emitting element irradiates a light incident portion of the core.

A photoelectronic device of the present invention is configured by putting an optical waveguide sheet for dividing a clock and a semiconductor chip together, and capable of maintaining the degree of freedom in designing for dealing with design changes and responding to producing a variety of kinds in small amounts.

The production method of a photoelectronic device of the present invention is to form a photoelectronic device by putting an optical waveguide sheet for dividing a clock and a semiconductor chip together, by which it is possible to maintain the degree of freedom in designing for dealing with design changes and it is possible to produce by responding to producing a variety of kinds in small amounts.

BRIEF DESCRIPTION OF DRAWINGS

These and other objects and features of the present invention will become clearer from the following description of the preferred embodiments given with reference to the attached drawings, in which:

FIG. 7A and FIG. 7B are sectional views showing a production procedure of the production method of the photoelectronic device according to the first embodiment of the present invention;

FIG. 8 is a schematic sectional view of a photoelectronic device according to a second embodiment of the present invention.

DESCRIPTION OF THE PREFERRED EMBODIMENT

Below, embodiments of a photoelectronic device configured that a light emitting element for emitting a light to be a clock and a semiconductor chip having an electronic circuit including a light receiving portion are optically connected by an optical waveguide sheet, and the production method will be explained with reference to the drawings.

First Embodiment

Figure 1A:
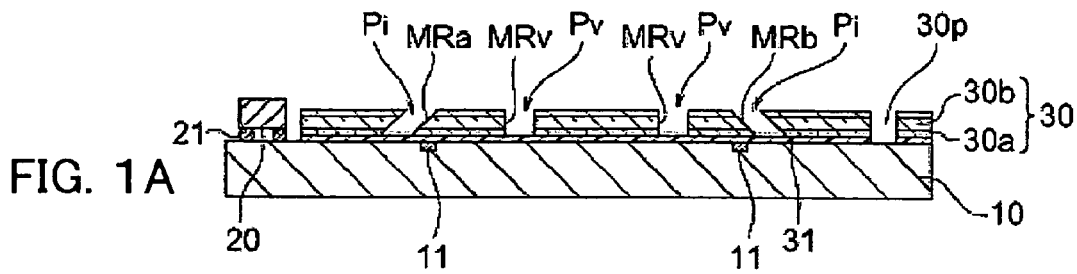
FIG. 1A is a schematic sectional view and FIG. 1B is a plan view of a photoelectronic device according to a first embodiment of the present invention.
Figure 1B:
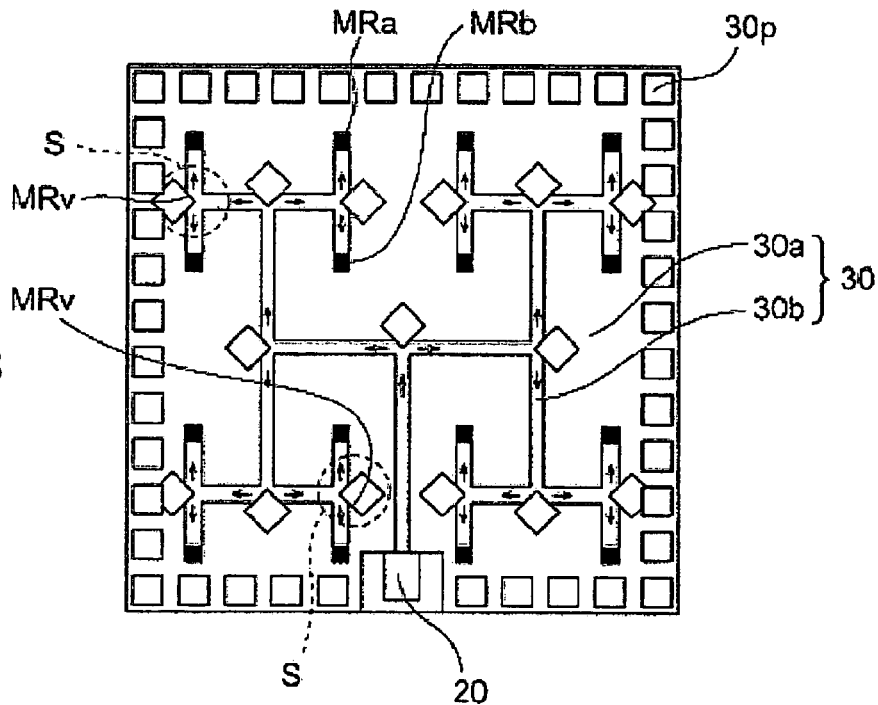

FIG. 1A is a schematic sectional view and FIG. 1B is a plan view of a photoelectronic device according to a first embodiment of the present invention.

A light emitting element 20 for emitting a light to be a clock signal, such as a semiconductor laser diode, is mounted on a surface of a semiconductor chip 10, furthermore, on the surface of the semiconductor chip 10, an optical waveguide sheet 30 formed to be a sheet shape, wherein an outer circumference of a core 30b stretching in stripes in the optical waveguide direction is covering with a clad 30a, is adhered by an adhesive layer 31.

The semiconductor chip 10 is formed with an electronic circuit including a light receiving portion 11, such as a photodiode.

The light emitting element 20 is mounted on the semiconductor chip 10 so as to be connected to pads of the semiconductor chip 10 via bumps 21.

The optical waveguide sheet 30 is irradiated at its light incident portion of the core 30b with a light from the light emitting element 20 from a side surface of the optical waveguide sheet 30, divides the light to two or more (16 in the figure) at one or more (15 in the figure) T-shaped branch S provided on the core, and guides the same.

The semiconductor chip 10 has the configuration that a plurality of light receiving portions 11 are provided, sloping opening portions $P_i$ having sloping inner walls with respect to the optical waveguide direction of the core 30b are provided at positions where the divided lights are connected to the light receiving portions 11, and the sloping inner walls function as mirror surfaces (MRa and MRb) to reflect the lights to the direction being out of the surface of the optical waveguide sheet 30 so as to be connected to the light receiving portions 11, so that the lights divided at the optical waveguide sheet 30 are respectively connected to the light receiving portions 11.

The inclination of the sloping inner walls of the sloping opening portions Pi is, for example, 45° with respect to the optical waveguide direction of the core 30b. The sloping directions of the mirror surfaces (MRa and MRb) are different in accordance with difference of the stretching direction of the core.

Figure 2:
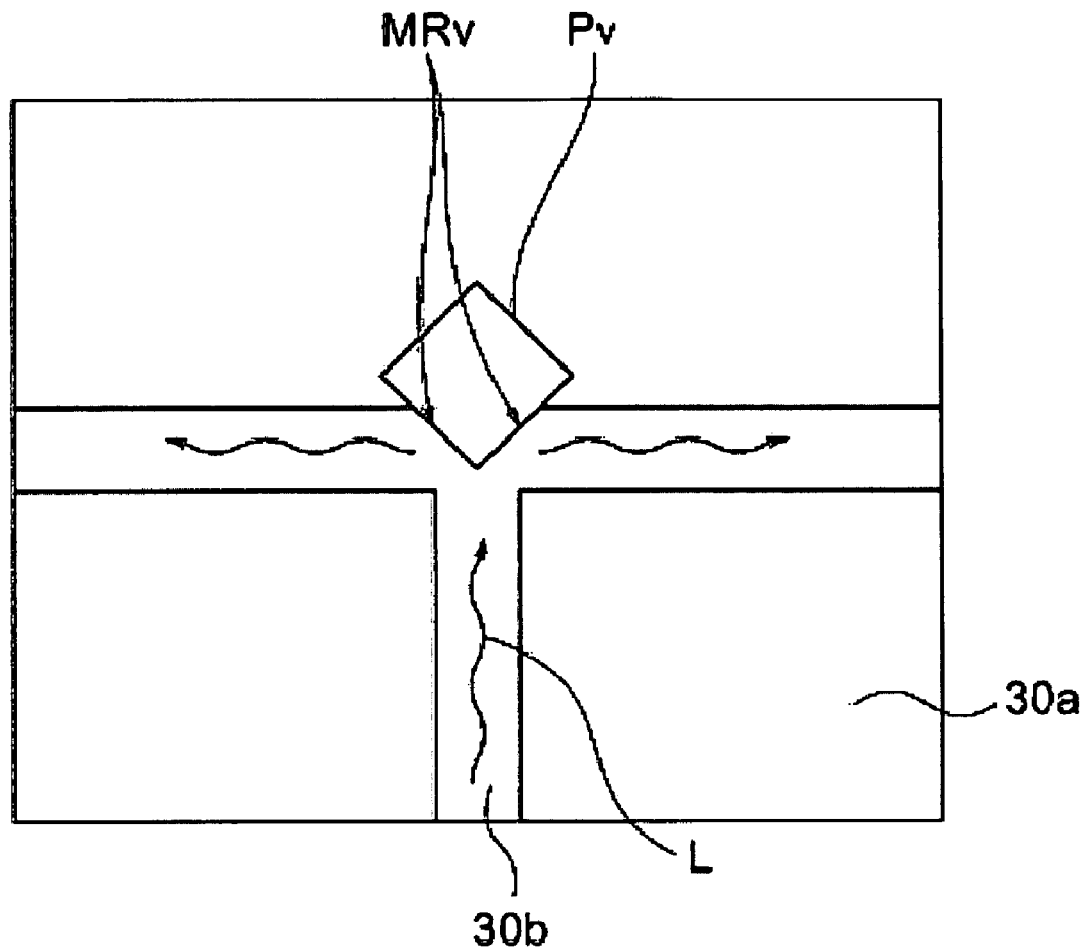
FIG. 2 is a schematic view for explaining the configuration of a vertical opening portion.

The above T-shaped branch S will be explained. FIG. 2 is a schematic view for explaining the configuration of a vertical opening portion.

The T-shaped branch S is a branching point in the clad 30a, where a core 30b is formed to be a pattern, so that one waveguide is branched to two and an angle made by the branched two waveguide directions becomes 180°.

At the T-shaped branch S, a vertical opening portion Pv having vertical inner walls with respect to the direction within the surface of the optical waveguide sheet is provided, and the vertical inner walls function as mirror surfaces (MRc and MRd) to divide, reflect and guide the light L to two different directions. The mirror surfaces (MRc and MRd) are surfaces having an inclination angle of, for example, 45° with respect to the incident direction and emitting direction of the T-shaped branch S, respectively.

The optical waveguide sheet is translucent to a wavelength of a light to be used and, for example, a polyimide resin, polyolefin resin, polynorbornene resin, acrylic resin and epoxy resin, etc. or fluoride and other organic based materials may be used.

The light receiving portion 11 of the semiconductor chip 10 is composed of a photodiode, etc. and, furthermore, for example, an amplifier is provided near that on the semiconductor chip 10 and a clock signal of an incident light is demodulated to an electric clock signal.

To open the pads on the semiconductor chip 10, pad opening portions 30p penetrating the optical waveguide sheet 30 and the adhesive layer 31 are formed. The pad opening portions 30p penetrating the optical waveguide sheet 30 are formed only on a region of not guiding a light.

On the optical waveguide sheet 30 of the photoelectronic device as above, distances of guiding lights from a position of a light incident portion of the core 30b to positions of connecting the lights to light receiving portions 11 are preferably equal in all paths that the lights divided to two or more are guided.

By attaining completely equal-length wiring in optical wiring for supplying a clock as explained above, a skew at the time of dividing a clock signal to a plurality of light receiving portions 11 can be almost suppressed.

According to the photoelectronic device according to the present embodiment explained above, it is configured by putting an optical waveguide sheet for dividing a clock and a semiconductor chip together, and capable of maintaining the degree of freedom in designing for dealing with design changes and responding to producing a variety of kinds in small amounts. Particularly, by attaining completely equal-length wiring in optical wiring for supplying a clock, a skew at the time of dividing a clock signal to a plurality of light receiving portions can be almost suppressed.

Also, in the case of using a Y-shaped branch for branching a light, while it also depends on a refractive index difference between the core and the clad, when assuming that a curvature radius able to be curved without a loss by entire reflection is 3 to 5 mm or so in a normal organic waveguide material and a size of a normal LSI is 10 mm×10 mm or so, it has been hard to adapt to the case of performing signal imputing at a large number of points as 16 or more when branching a light in an H-tree shape. On the other hand, the photoelectronic device according to the present embodiment as above uses T-shaped branch and is capable of dealing with signal inputting at a large number of points as 16 or more.

Next, a production method of a photoelectronic device according to the present embodiment will be explained.

A semiconductor chip and light emitting element can be produced by using well known processes.

Figure 3A:
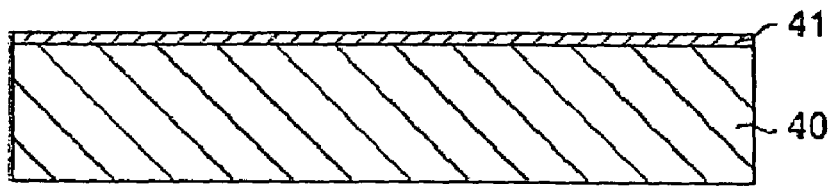
FIG. 3A to FIG. 3C are sectional views showing a production procedure of a production method of the photoelectronic device according to the first embodiment of the present invention.

As a method of forming an optical waveguide sheet, first, as shown in FIG. 3A, a stacked body of a titanium layer and a copper layer is formed on a surface of a dummy substrate 40 made by silicon or glass, etc., for example, by the electron beam evaporation method or the sputtering method, etc. to obtain a release layer 41. Alternately, a release layer 41 may be also obtained by forming a silicon oxide layer by the CVD (Chemical Vapor Disposition) method or the sputtering method. In this case, silicon, etc. is used for the dummy substrate 40.

Figure 3B:
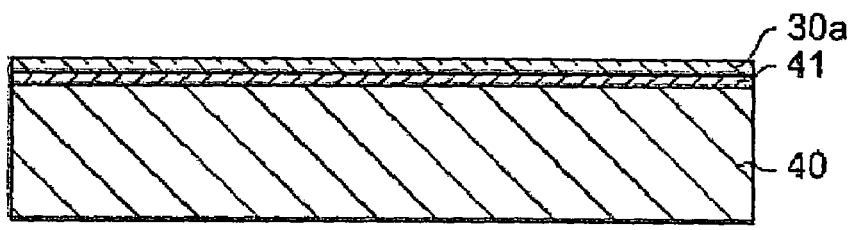

Next, as shown in FIG. 3B, a resin layer having a first refractive index is formed by a polyimide resin, etc., for example, by the spin coating method or the printing method and cured by performing curing processing to obtain a first clad 30a.

Figure 3C:
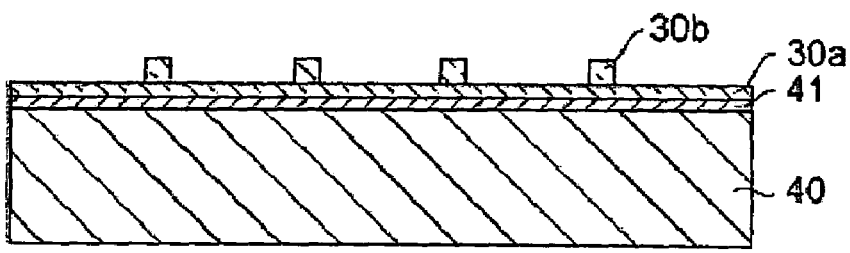

Next, as shown in FIG. 3C, a photosensitive resin layer having a second refractive index, which is higher than the first refractive index, is formed, for example, by photosensitive polyimide, etc., performing exposure by using a patterning mask and, furthermore, performing curing processing to form a core 30b.

For simplifying the mounting, when assuming multimode propagation, a suitable thickness and width of the core 30b are about 5 to 50 µm and a suitable thickness of the clad 30a is about ¼ to ½ of that of the core 30b.

Figure 4A:
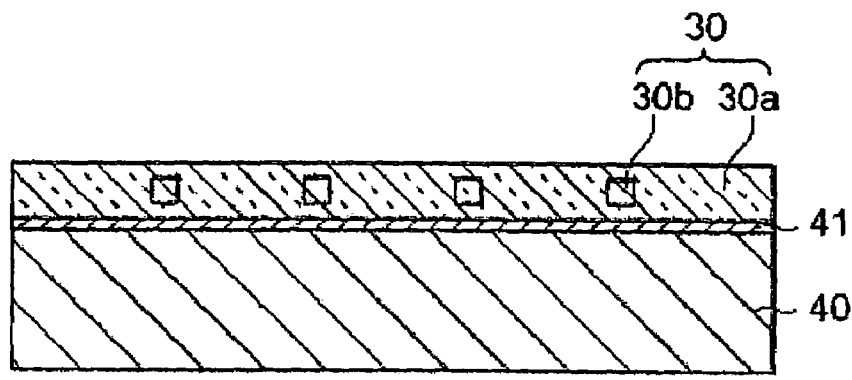
FIG. 4A and FIG. 4B are sectional views showing a production procedure of the production method of the photoelectronic device according to the first embodiment of the present invention.

Next, as shown in FIG. 4A, in the same way as the above, a resin layer having a first refractive index is formed by a polyimide resin, etc., for example, by the spin coating method or the printing method, heating reflow is performed if necessary, and curing processing is performed for curing to form a first clad 30a.

As explained above, an optical waveguide sheet 30, wherein an outer circumference of the core 30b is covered by the clad 30a, is formed.

Figure 4B:
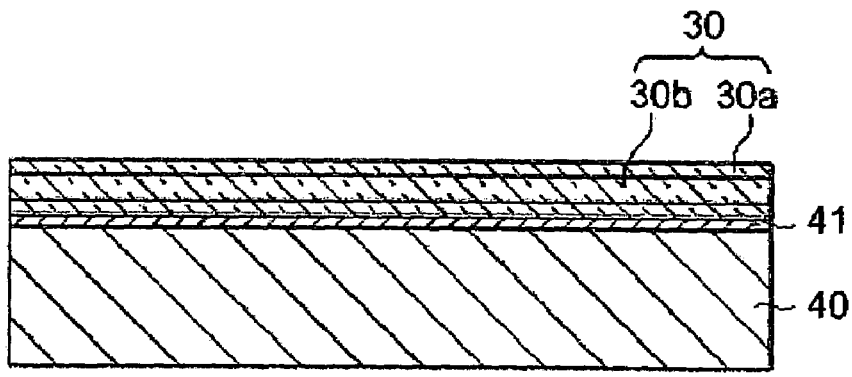

FIG. 4B shows a section in parallel with the stretching direction of the core in the state shown in FIG. 4A and is a section in the direction being perpendicular to that in FIG. 4A. Steps after this will be performed along the section in this direction.

Figure 5A:
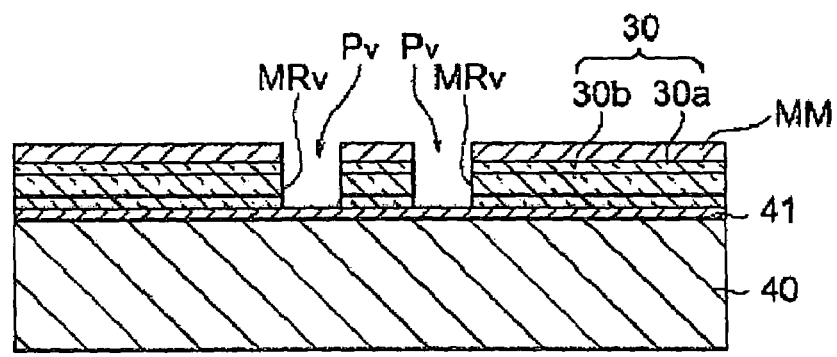
FIG. 5A to FIG. 5C are sectional views showing a production procedure of the production method of the photoelectronic device according to the first embodiment of the present invention.

Next, as shown in FIG. 5A, a metal mask MM in a pattern having an opening at a region for forming the T-shaped branch is formed. This can be formed by forming, for example, a metal layer allover the surface, forming a pattern of a resist film in a pattern having an opening at a region for forming the T-shaped branch by the photolithography step, and using it as a mask for etching the metal layer.

Next, the metal mask MM is used as a mask for performing anisotropic dry etching, such as the RIE (reactive ion etching), vertically with respect to the optical waveguide sheet 30, and a vertical opening portion Pv is formed on the optical waveguide sheet 30. At this time, to enhance the anisotropy, a step etching for repeating stacking of a protective film for protecting an etching side walls and etching alternately may be performed. Also, it is preferable to apply a method of lowering a gas pressure of an etching atmosphere or maintaining a low temperature, etc. As to a kind of gas at this time, by mixing a fluorocarbon based gas with $O_2$ and $H_2$, etc. as additives or by mixing with an inert gas, such as Ar and Xe, generation of etching residual can be prevented at the same time.

From the above steps, a pattern of a vertical opening portion Pv is formed, so that the vertical inner walls of the vertical opening portion Pv become mirror surfaces (MRc and MRd) for dividing, reflecting and guiding a light guided through the core 30b to two different directions.

After the above step, the metal mask MM is released.

Figure 5B:
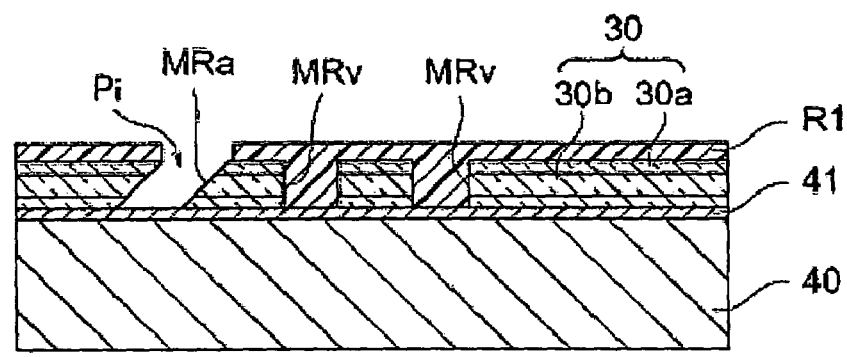

Next, as shown in FIG. 5B, a resist film R1 in a pattern having openings at positions of connecting lights to light receiving portions is formed on the optical waveguide sheet 30 by the photolithography processing, and by using the resist film R1 as a mask, anisotropic etching, such as RIE (reactive ion etching), is performed by inclining, for example, by about 45° with respect to the optical waveguide sheet 30. As a result, a sloping opening portion Pi having an inclination (for example, 45°) with the optical waveguide direction of the core 30b and having a sloping inner wall to be a mirror surface MRa for reflecting a guided light to the direction being out of the surface of the optical waveguide sheet 30 and connecting the same to a light receiving portion is formed.

After the above step, the resist film R1 is released.

Figure 5C:
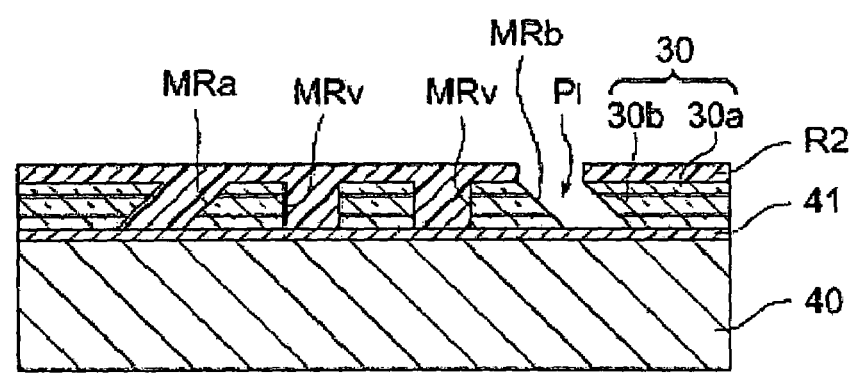

Next, as shown in FIG. 5C, on portions, wherein the stretching direction of the core is different from that in the sloping opening portion Pi having a sloping inner wall to be the mirror surface MRa, a resist film R2 in a pattern having openings at positions of connecting lights to light receiving portions is formed by photolithography processing, and by using the resist film R2 as a mask, anisotropic etching, such as RIE (reactive ion etching), is performed by inclining, for example, by about 45° with respect to the optical waveguide sheet 30. As a result, a sloping opening portion Pi having a sloping inner wall to be a mirror surface MRb having an inclination (for example, 45°) with respect to the optical waveguide direction of the core 30b but in the different direction from that of the sloping opening portion Pi having a sloping inner wall to be the mirror surface MRa is formed.

After the above step, the resist layer R2 is released.

Figure 6A:
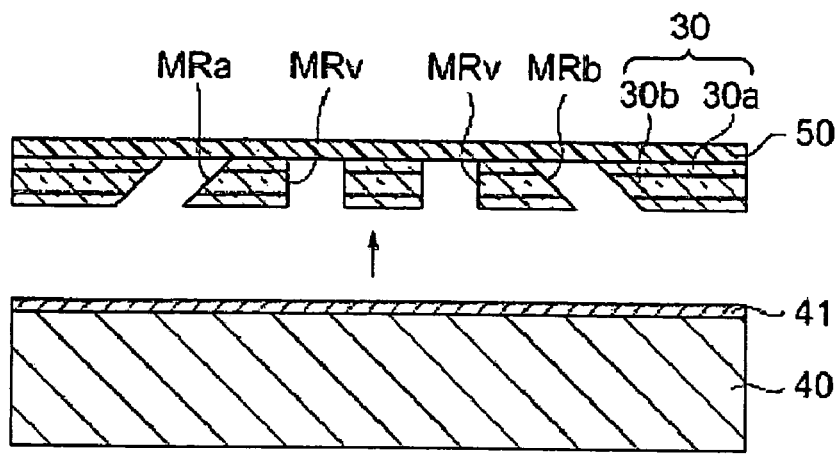
FIG. 6A to FIG. 6C are sectional views showing a production procedure of the production method of the photoelectronic device according to the first embodiment of the present invention.

Next, as shown in FIG. 6A, an adhesive thermal release sheet 50, which can be released at a specific temperature, is adhered to the surface of the optical waveguide sheet 30, and a boundary face of the release layer 41 and the clad 30a of the optical waveguide sheet 30 is released.

The thermal release sheet is configured, for example, by dispersing foam capsules in an adhesive agent on a PET film and, for example, REVALPHA made by Nitto Denko Corp., etc. may be used. For example, it can be easily removed by heating the PET film to 70° C. to 150° C.

In the case of using as a release layer 41 a stacked body of a titanium layer and a copper layer, it is released by immersing the optical waveguide sheet 30 supported by the above thermal release sheet 50 in acid, such as hydrochloric acid. Alternately, in the case of using a silicon oxide layer as the release layer 41, the optical waveguide sheet 30 supported by the above thermal release sheet 50 is immersed in acid, such as fluorinated acid or buffered fluorinated acid to dissolve the release layer 41.

Figure 6B:
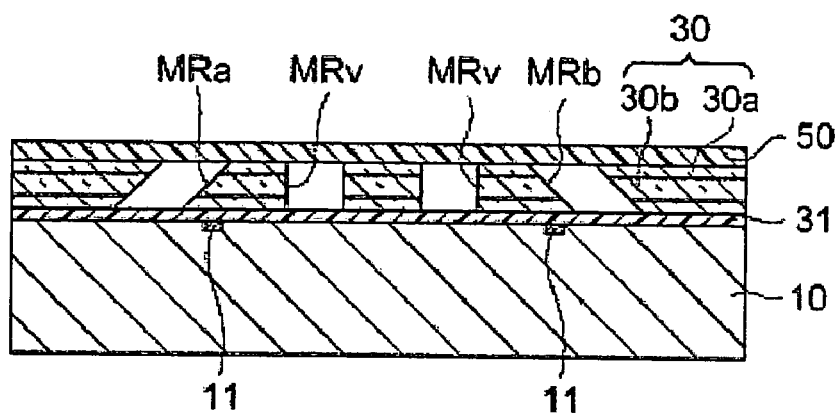

Next, as shown in FIG. 6B, on the semiconductor chip 10 formed with light receiving portions 11 on its surface in advance, the optical waveguide sheet 30 is adhered by aligning the positions of the mirror surfaces (MRa and MRb) of the sloping opening portion Pi with the positions of the light receiving portions 11 via an adhesive sheet (adhesive layer) 31 being translucent to a wavelength of the light to be used.

Figure 6C:
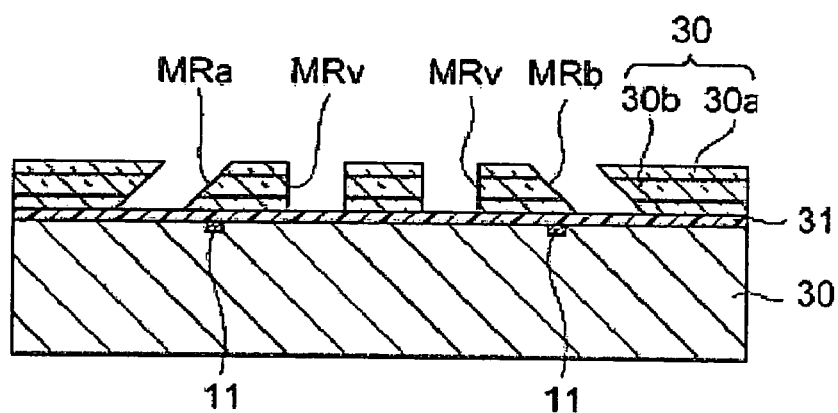

Next, as shown in FIG. 6C, the thermal release sheet 50 is released, and the optical waveguide sheet 30 is transferred on the semiconductor chip 10.

After this, in accordance with need, pad opening portions (not shown) for penetrating the optical waveguide sheet 30 and the adhesive layer 31 are formed for opening the pads of the semiconductor chip 10. They can be formed by forming the pads on the semiconductor chip 10 side and irradiating a laser beam, such as $CO_2$ laser and excimer laser. At this time, the pads become stoppers of the laser beam.

Next, as shown in FIG. 7A and FIG. 7B, bumps 21, such as gold bumps, are formed on the light emitting element 20, such as laser diode, for example, by wire bonding, etc. in advance, and mounting them on the adhering surface of the optical waveguide sheet 30 of the semiconductor chip 10. In the drawings, illustration of the opening portions having inner walls to be mirror surfaces is omitted.

Here, the mounting portion of the semiconductor chip 10 is pre-coated with soldering 22 by the printing method, etc. and the light emitting portion of the light emitting element 20 is aligned with the light incident portion of the core for mounting. At this time, the mounting accuracy can be improved by using a head having a heater for melting soldering by heating, holding after turning off the heater until cooling and removing the heater.

A height of the gold bumps 21 and a thickness of the pre-coating of the soldering 22 are determined in accordance with a position of the core of the optical waveguide sheet for aligning.

Since the gold bumps 21 do not dissolve, the bumps 21 function as spacers, so that a height of the light emitting element 20 can be determined by the height of the bumps 21 and high accuracy can be constantly secured.

As a method of mounting the light emitting element 20 other than the above, a method of forming bumps obtained by coating copper cores by soldering on the light emitting element side, forming a pre-coating of soldering on the semiconductor chip side and mounting as a flip chip, and a method of forming a spacer by nickel plating, etc. on any one of the light emitting element and the semiconductor chip, and mounting as a flip chip by soldering bumps or soldering pre-coating may be used.

According to the production method of the photoelectronic device according to the above present embodiment, it is configured by putting an optical waveguide sheet for dividing a clock and a semiconductor chip together, and capable of maintaining the degree of freedom in designing for dealing with design changes and responding to producing a variety of kinds in small amounts. Particularly, by attaining completely equal-length wiring in optical wiring for supplying a clock, a skew at the time of dividing a clock signal to a plurality of light receiving portions can be almost suppressed.

Furthermore, it is possible to always produce a large amount of films to be the base of the optical waveguide sheet formed as above for dividing a light to be a clock signal, and it is possible to form a sloping opening portion having a sloping inner wall to be a mirror surface at any position in the post-processing. Therefore, even if design of the LSI itself is changed or there are many kinds of LSI having different specifications, it is possible to respond to that each time.

As a result, it is possible to suppress the production cost, reduce the developing period and TAT, and develop an LSI, wherein a skew is suppressed.

In the production method of the photoelectronic device according to the above present embodiment, an example of producing an optical waveguide sheet to be a base on a dummy substrate, such as silicon, by a stepwise procedure was explained, but there is also a method of collectively producing by preparing rolls of a polyimide film to be a base, and applying a core material, for example, by the roll-to-roll processing and patterning. A furthermore large cost reduction can be attained thereby.

Second Embodiment

FIG. 8 is a schematic sectional view of a photoelectronic device according to the second embodiment of the present invention.

It is configured that a semiconductor chip 10 adhered to an optical waveguide sheet 30 and a light emitting element are mounted on an interposer 60, and a light from the light emitting element 20 is irradiated from the side surface of the optical waveguide sheet 30 to the core. Other configuration than that is substantially the same as that of the first embodiment.

Namely, the light emitting element 20, such as a semiconductor laser diode, for emitting a light to be a clock signal is mounted on the surface of the semiconductor chip 10 and, further thereon, the optical waveguide sheet 30 formed to be a sheet, wherein an outer circumference of the core 30b stretching in stripes in the optical waveguide direction is covered with a clad 30a, is adhered to the semiconductor chip 10 by an adhesive layer 31.

The semiconductor chip 10 is formed with an electronic circuit including a light emitting portion 11, such as photodiode.

Also, pad opening portions for penetrating the optical waveguide sheet 30 and the adhesive layer 31 are formed for opening pads of the semiconductor chip 10, and bumps 12 are formed to be connected to the pads.

On the interposer 60 formed by stacking a first resin layer 61, a second resin layer 62 and a third resin layer 63 and forming a wiring pattern 64 by penetrating the layers and the boundary faces, a semiconductor chip 10 adhered to the optical waveguide sheet 30 is mounted via the bumps 12.

Also, on the same surface of the interposer 60 as the surface mounted with the semiconductor chip 10, the light emitting element 20 is mounted.

On the opposite surface of the surface mounted with the semiconductor chip 10 of the interposer 60 is formed with bumps 65 and mounted on still another mounting substrate for use.

As the interposer 60, all kinds of organic wiring substrates, such as a so-called FR-4 substrate, FR-5 substrate, BT-resin substrate, polyimide substrate, and ceramic wiring substrates, such as alumina and glass ceramic, can be used.

On the other hand, laser diode to be a light source of a light clock is mounted, for example, on an end portion of the optical waveguide sheet and being close to the core, so that a light is effectively irradiated to the core of the optical waveguide, and a laser driver for driving the laser diode is mounted close to that on the interposer 60.

According to the photoelectronic device according to the above present invention, it is configured by putting an optical waveguide sheet for dividing a clock and a semiconductor chip together, and capable of maintaining the degree of freedom in designing for dealing with design changes and responding to producing a variety of kinds in small amounts. Particularly, by attaining completely equal-length wiring in optical wiring for supplying a clock, a skew at the time of dividing a clock signal to a plurality of light receiving portions can be almost suppressed.

Third Embodiment

Figure 9:
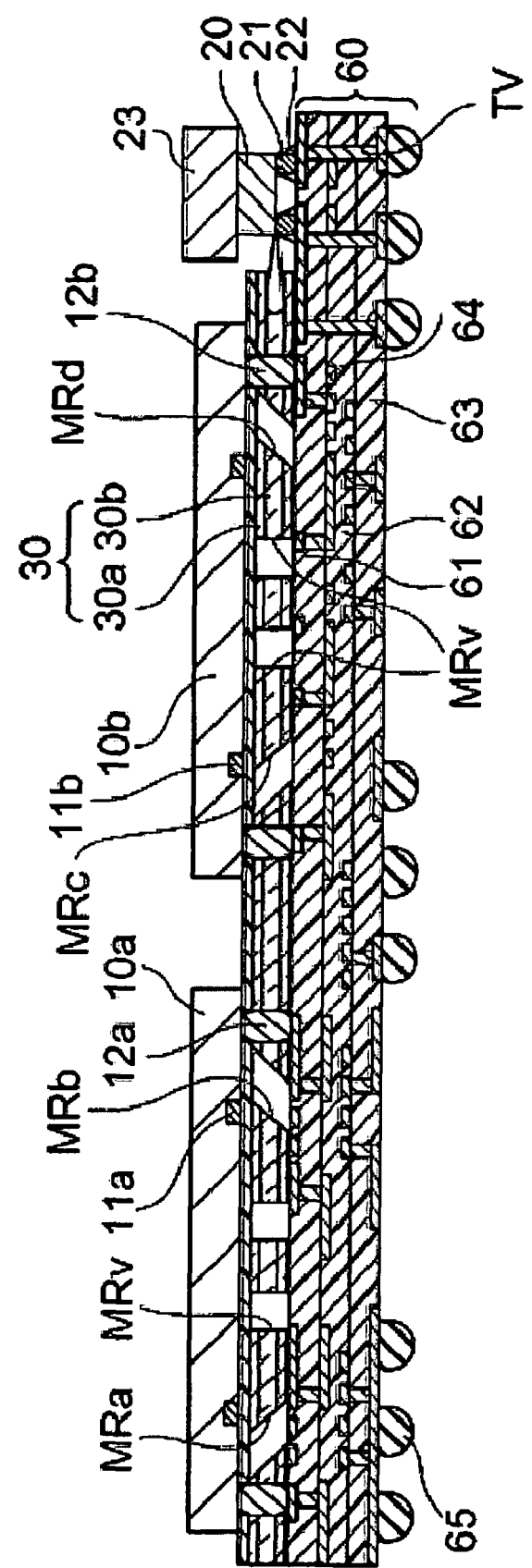
FIG. 9 is a schematic sectional view of a photoelectronic device according to a third embodiment of the present invention

FIG. 9 is a schematic sectional view of a photoelectronic device according to the third embodiment of the present invention.

A plurality of semiconductor chips (10a and 10b) are adhered to an optical waveguide sheet 30 and mounted on an interposer 60. Also, a light emitting element 20 is also mounted on the interposer 60, and it is configured that a light from the light emitting element 20 is irradiated to the core from a side surface of the optical waveguide sheet 30. Other configuration than that is substantially the same as that in the first embodiment.

In the photoelectronic device of the present embodiment, it can be configured that the plurality of semiconductor chips are respectively provided with light receiving portions, and each of the light receiving portions is connected to each of lights divided at the optical waveguide sheet.

Furthermore, it may be configured that a part or all of the plurality of semiconductor chips is provided with a plurality of light receiving portions, and each of the light receiving portions is connected to each of the lights divided at the optical waveguide sheet.

For example, the first semiconductor chip 10a is formed with a plurality of light receiving portions 11a, which are optically connected by mirror surfaces (MRa and MRb) provided on the optical waveguide sheet.

On the other hand, the second semiconductor chip 10b is formed with a plurality of light receiving portions 11b, which are optically connected by mirror surfaces (MRc and MRd) provided on the optical waveguide sheet.

Also, for example, by configuring that the light emitting element 20 is connected to a cooling body 23 and provided with a thermal via TV penetrating through the interposer, reliability of the photoelectronic device can be improved.

It can be produced by holding the optical waveguide sheet with the light emitting side facing upward, successively mounting the semiconductor chip by aligning the light emitting portion with positions of the light receiving portions on the semiconductor chip via an adhesive sheet, furthermore, providing pad opening portions reaching to the pads of the semiconductor chip, and mounting on the interposer via the bumps.

According to the photoelectronic device according to the above present embodiment, it is configured that the optical waveguide sheet for dividing a clock and the semiconductor chip are put together, and capable of maintaining the degree of freedom in designing for dealing with design changes and responding to producing a variety of kinds in small amounts. Particularly, by attaining completely equal-length wiring in optical wiring for supplying a clock, a skew at the time of dividing a clock signal to a plurality of light receiving portions can be almost suppressed.

According to the photoelectronic device according to the above present embodiment, a problem of a clock skew caused when the semiconductor chip becomes high at speed is solved, an erroneous operation can be prevented, timing analysis of a clock requiring a long time in the designing means of the related art becomes unnecessary, and the design development period can be widely reduced.

Also, as in the production methods of the photoelectronic devices in the respective embodiments, by producing the optical waveguide sheet separately, a mechanism of supplying a very inexpensive clock very fast can be realized comparing with the case of the related art, wherein an optical waveguide is formed on a semiconductor chip every time.

It is possible to flexibly respond to design changes of a semiconductor chip, and convenience and reusability particularly in a stage of developing prototypes of a number of kinds in small amounts are very high.

Also, a branch in the photoelectronic devices of the respective embodiments is different from a Y-shaped guiding branch and has no limit on bending, so that a clock without a skew can be supplied to many points as up to 6 branches to 10 branches (64 to 1024 in points) or so on an LSI of about 10 mm×10 mm.

The photoelectronic device of the present embodiment can be used for computer apparatuses, particularly, MPU or an image processing processor requiring a large capacity and signal processing at a high speed, such as a game computer, network server, home server and brain of a robot, and ultrahigh-speed signal processing LSI, such as a high-speed cash memory.

The present invention is not limited to the above explanation.

For example, as a semiconductor chip to be put together with the optical waveguide sheet, a SiP (Systems-in-package semiconductor device) can be used and, for example, a package combining a semiconductor chip having an active element, such as a transistor, and a passive element, such as an inductance, capacitor or electric resistance element, can be used.

As an optical device incorporated in a SiP, light emitting diode, etc. can be used other than laser diode.

Other than the above, a variety of modifications can be made within the scope of the present invention.

The photoelectronic device of the present invention can be applied to a photoelectronic device configured that a light emitting element for emitting a light to be a clock signal and a semiconductor chip having an electron circuit including a light receiving portion are optically connected by an optical waveguide sheet.

The production method of the photoelectronic device of the present invention can be applied to produce a photoelectronic device configured that a light emitting element for emitting a light to be a clock signal and a semiconductor chip having an electron circuit including a light receiving portion are optically connected by an optical waveguide sheet.

It should be understood by those skilled in the art that various modifications, combinations, sub-combinations and alternations may occur depending on design requirements and other factors insofar as they are within the scope of the appended claims or the equivalents thereof.

What is claimed is:

1. A photoelectronic device, comprising:
   a light emitting element for emitting a light to be a clock signal;
   a semiconductor chip provided with light receiving portions for receiving said light; and
   an optical waveguide sheet formed to be a sheet, wherein an outer circumference of a core is covered with a clad, and adhered to said semiconductor chip; wherein
   said optical waveguide sheet is irradiated at a light incident portion of said core with said light from said light emitting element;
   said optical waveguide sheet is provided with one or more T-shaped branch, and at each T-shaped branch is provided with a vertical opening portion having a vertical inner wall being vertical with respect to the direction within a surface of said optical waveguide sheet, and said vertical inner wall serves as a mirror surface for dividing, reflecting and guiding said light to two different directions; and
   a sloping opening portion having a sloping inner wall having an inclination with the optical waveguide direction of said core is provided at a position of connecting each of said divided lights to each of said light receiving portions, and said sloping inner wall serves as a mirror surface for reflecting said light to the direction being out of the surface of said optical waveguide sheet to be connected to said light receiving portion.

2. A photoelectronic device as set forth in claim 1, wherein in said optical waveguide sheet, distances from a position of a light incident portion of said core to positions of respectively connecting said lights to said light receiving portions are equal in all paths that the lights divided to two or more are guided.

3. A photoelectronic device as set forth in claim 1, wherein said sloping inner wall of said sloping opening portion has an inclination of about 45° with respect to the optical waveguide direction of said core.

4. A photoelectronic device as set forth in claim 1, wherein
   said semiconductor chip is provided with a plurality of said light receiving portions; and
   said lights divided at said optical waveguide sheet are connected to said respective light receiving portions.

5. A photoelectronic device as set forth in claim 1, comprising a plurality of said semiconductor chips; and
   said lights divided at said optical waveguide sheet are respectively connected to respective light receiving portions provided respectively to said plurality of semiconductor chips.

6. A photoelectronic device as set forth in claim 5, wherein a part or all of said plurality of semiconductor chips is provided with a plurality of light receiving portions; and said lights divided at said optical waveguide sheet are respectively connected to said respective light receiving portions.

7. A photoelectronic device as set forth in claim 1, wherein said light emitting element is mounted on a surface of said semiconductor chip on the side adhered to said optical waveguide sheet; and a light from said light emitting element irradiates said core from a side surface of said optical waveguide sheet.

8. A photoelectronic device as set forth in claim 1, wherein said semiconductor chip adhered to said optical waveguide sheet and said light emitting element are mounted on an interposer; and a light from said light emitting element irradiates said core from a side surface of said optical waveguide sheet.

9. A photoelectronic device as set forth in claim 8, wherein a plurality of said semiconductor chips are adhered to said optical waveguide sheet and mounted on said interposer.

10. A production method of a photoelectronic device for producing a photoelectronic device including a light emitting element for emitting a light to be a clock signal, a semiconductor chip provided with light receiving portions for receiving said light, and an optical waveguide sheet for dividing said light to two or more and guiding the same to be connected to said light receiving portions at positions of connecting to said light receiving portions, comprising the steps of:

forming a first clad on a dummy substrate, forming a core on said first clad to be a pattern having one or more T-shaped branch, forming a second clad to cover said core, thereby forming an optical waveguide sheet formed to be a sheet wherein an outer circumference of the core is covered with the clad;

forming at a position of said T-shaped branch on said optical waveguide sheet a vertical opening portion having a vertical inner wall, which is vertical with respect to the direction within the surface of said optical waveguide sheet and becomes a mirror surface for dividing and reflecting said light to two different directions;

forming at a position of connecting said light to said light receiving portion on said optical waveguide sheet a sloping opening portion having a sloping inner wall, which has an inclination with the optical waveguide direction of said core and becomes a mirror surface for reflecting said light to the direction being out of the surface of said optical waveguide sheet so as to be connected to said light receiving portion;

releasing said optical waveguide sheet from said dummy substrate;

aligning said optical waveguide sheet with said light receiving portion and adhering to said semiconductor chip; and mounting said light emitting element by arranging the same, so that a light from said light emitting element irradiates a light incident portion of said core.

11. A production method of a photoelectronic device as set forth in claim 10, wherein in the step of forming said optical waveguide sheet, the optical waveguide sheet is formed, so that distances of guiding said lights from a position of a light incident portion of said core to positions of connecting said respective lights to said light receiving portions become equal in all paths that the lights divided to two or more are guided.

12. A production method of a photoelectronic device as set forth in claim 10, further including the step of forming a release layer on a surface of said dummy substrate before the step of forming said optical waveguide sheet on said dummy substrate, wherein, in the step of forming said optical waveguide sheet, the optical waveguide sheet is formed on said release layer; and in the step of releasing said optical waveguide sheet from said dummy substrate, it is released on a boundary surface of said optical waveguide sheet and said release layer.

13. A production method of a photoelectronic device as set forth in claim 12, wherein said release layer is a stacked body of a titanium layer and a copper layer, or a silicon oxide layer.

14. A production method of a photoelectronic device as set forth in claim 10, wherein in the step of forming said sloping opening portion, said sloping inner wall of said sloping opening portion is formed to have an inclination of about 45° with respect to the optical waveguide direction of said core.

15. A production method of a photoelectronic device as set forth in claim 10, wherein in the step of mounting said light emitting element, said light emitting element is mounted on a surface of said semiconductor chip on the side adhered to said optical waveguide sheet, so that a light from said light emitting element irradiates said core from a side surface of said optical waveguide sheet.

16. A production method of a photoelectronic device as set forth in claim 10, furthermore including the step of mounting said semiconductor chip adhered to said optical waveguide sheet on an interposer, wherein in the step of mounting said light emitting element, said light emitting element is mounted on said interposer, so that a light from said light emitting element irradiates said core from a side surface of said optical waveguide sheet.

* * * * *